(12) United States Patent
Gururaj et al.

(10) Patent No.: US 11,169,854 B2
(45) Date of Patent: Nov. 9, 2021

(54) NODE ELIGIBILITY DETERMINATIONS

(71) Applicant: Hewlett Packard Enterprise Development LP, Houston, TX (US)

(72) Inventors: Prabhanjan Gururaj, Bangalore (IN); Hari Sahaya Tiwari, Bangalore (IN); Parag Gaur, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 189 days.

(21) Appl. No.: 16/263,680

(22) Filed: Jan. 31, 2019

(65) Prior Publication Data

US 2020/0250002 A1 Aug. 6, 2020

(51) Int. Cl.
*G06F 9/50* (2006.01)

(52) U.S. Cl.
CPC ............ *G06F 9/5044* (2013.01); *G06F 9/505* (2013.01); *G06F 9/5055* (2013.01)

(58) Field of Classification Search
CPC ...... G06F 9/5044; G06F 9/505; G06F 9/5055; G06F 2209/501; G06F 9/5027
USPC ..................................................... 718/1–108
See application file for complete search history.

(56) References Cited

U.S. PATENT DOCUMENTS

| | | | |
|---|---|---|---|
| 8,838,755 B2 | 9/2014 | Sanghvi | |
| 9,467,330 B2* | 10/2016 | Stuart | H04L 41/0631 |
| 9,515,905 B1 | 12/2016 | Blanding | |
| 10,198,709 B2* | 2/2019 | Brignone | G06Q 10/087 |
| 2013/0061238 A1 | 3/2013 | Archer | |
| 2016/0036924 A1* | 2/2016 | Koppolu | H04L 67/1025 709/224 |
| 2016/0323377 A1* | 11/2016 | Einkauf | H04L 29/0827 |
| 2018/0285166 A1* | 10/2018 | Roy | G06F 12/08 |

FOREIGN PATENT DOCUMENTS

| | | |
|---|---|---|
| CN | 102308559 A | 1/2012 |
| CN | 106789193 A | 5/2017 |
| WO | 2016/108945 A1 | 7/2016 |

OTHER PUBLICATIONS

Kannan, Subramanian, et al. "Workload management with loadleveler." IBM Redbooks 2.2 (2001): pp. 1-228 (Year: 2001).*

(Continued)

*Primary Examiner* — Satish Rampuria
(74) *Attorney, Agent, or Firm* — Brooks, Cameron & Huebsch, PLLC

(57) ABSTRACT

An example system including a processing resource and a memory resource. The memory resource may store instructions executable by the processing resource to receive, at a software-defined node of a computational infrastructure, a policy specifying a node metric criterion associated with executing a workload at the node; collect a present node metric corresponding to the specified node metric criterion at the node; receive a prediction, based on historical data, of a future modification to the present node metric corresponding to the specified node metric criterion at the node; determine, at the software-defined node, an eligibility value of the node to execute the workload based on the specified node metric criterion, the present node metric criterion, and the predicted future node metric criterion; and determine whether to deploy the workload to the node for execution based on the determined eligibility value.

18 Claims, 5 Drawing Sheets

(56) References Cited

OTHER PUBLICATIONS

Quiroz, Andres, et al. "Towards autonomic workload provisioning for enterprise grids and clouds." 2009 10th IEEE/ACM International Conference on Grid Computing. IEEE, 2009.pp. 50-57 (Year: 2009).*
Xu, Xiaolong, Lingling Cao, and Xinheng Wang. "Adaptive task scheduling strategy based on dynamic workload adjustment for heterogeneous Hadoop clusters." IEEE Systems Journal 10.2 (2014): pp. 471-482. (Year: 2014).*
Melo, Carlos, et al. "Capacity-oriented availability model for resources estimation on private cloud infrastructure." 2017 IEEE 22nd Pacific Rim International Symposium on Dependable Computing (PRDC). IEEE, 2017.pp.255-260 (Year: 2017).*
Nencioni, Gianfranco, et al. "Availability modelling of software-defined backbone networks." 2016 46th Annual IEEE/IFIP International Conference on Dependable Systems and Networks Workshop (DSN-W). IEEE, 2016.pp. 105-112 (Year: 2016).*
Hariri, Salim, and Hasan Mutlu. "Hierarchical modeling of availability in distributed systems." IEEE Transactions on Software Engineering 21.1 (1995): pp. 50-56. (Year: 1995).*
"Moab Workload Manager," Administrator's Guide Version 5.4.2, 2001-2010, <http://docs.adaptivecomputing.com/mwm/archive/6-0/MWMAdminGuide.pdf >.
"Scheduler," Retrieved from Internet Nov. 22, 2018, <https://docs.openshift.eom/enterprise/3.2/admin_guide/scheduler.html >.
Kevin Fernandez, "Advanced VM Placement Intelligence: Allows yourVMs to Focus on Running Workloads," Sep. 20, 2016, https://www.nutanix.com/2016/09/20/advanced-vm-placement-intelligence-allows-vms-focus-running-workloads/>.

\* cited by examiner

NODE ELIGIBILITY DETERMINATIONS

BACKGROUND

An application may include instructions executable by a processing resource to provide a service and/or specific function for an end user or another application. The application may utilize computational resources of computing devices and/or servers to execute a given workload of the application. For example, an application may be supported by a group of computing device and/or servers.

Each of the computing devices and/or servers may be considered a node. The group of nodes may be collectively considered a cluster. Each node in the cluster may be able to communicate with other nodes within the cluster. The nodes may execute the application workloads. In some examples, multiple nodes may execute the same application workload.

DETAILED DESCRIPTION

Figure 1:
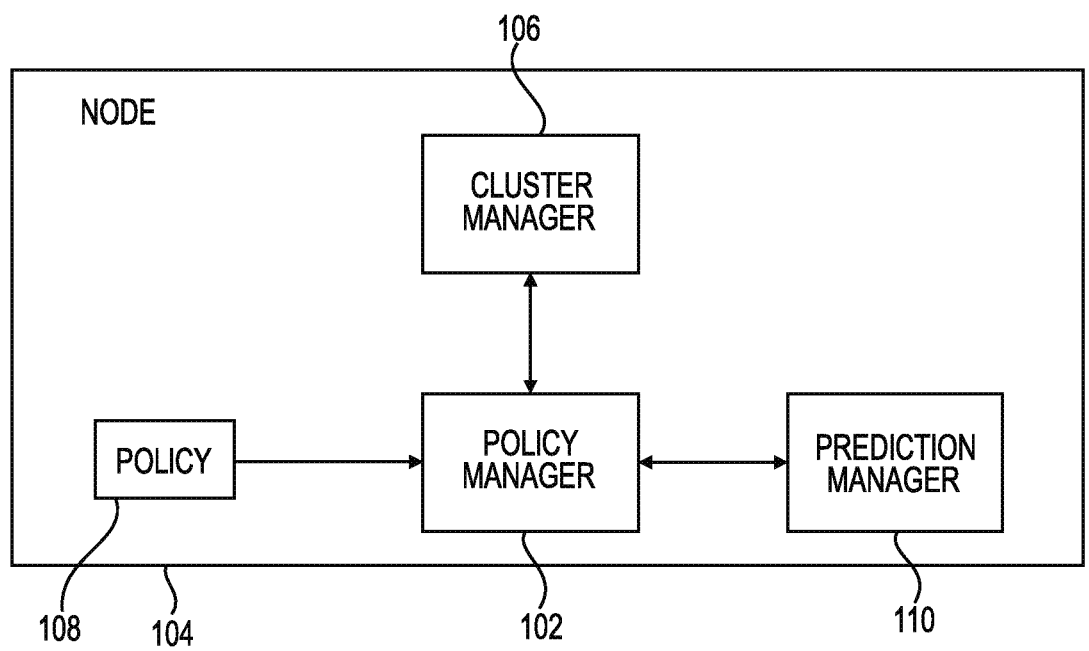
FIG. 1 illustrates an example of node eligibility determinations consistent with the disclosure.

A variety of computing resources may be utilized to execute application workloads. In some examples, a computational infrastructure including distributed computing resources may be arranged and/or managed according to a software defined architecture that facilitates redundant and/or efficient execution of application workloads. For example, computing resources such as computing devices, servers, data storage device, etc. in a networked computing environment may be logically organized into software-defined nodes, clusters of nodes, and/or partitions of clusters utilizing a composable infrastructure approach. A software defined node may include computing resources such as computing devices, servers, data storage devices, networking devices, virtual machines, etc. assigned to a node identity. A cluster may include a logically organized group of such nodes. A partition of a cluster may include a sub-group of the nodes with the cluster.

In composable infrastructure, the computing devices, servers, data storage devices, networking devices, etc. may be abstracted from their physical locations and may be managed by software, through a web-based interface. Such composable infrastructure may make data center resources as readily available as cloud services. Further composable infrastructure may eliminate workload-specific environments and provide a set of computational resources that may be fluidly combined to support an application workload. As opposed to static models, utilization of a composable infrastructure model may allow nodes to be dynamically provisioned and/or added or removed from a cluster.

Managing the computational infrastructure may include placing workloads from an application on a node. Workload placement may include selecting a node in a cluster to execute the application workload. Workload placement may be performed as an initial assignment upon origination of a workload. Additionally, the nodes and/or clusters may experience events. The events may trigger a workload placement and/or a shift in a workload placement. An event may include an addition, a subtraction, an error, a failure, a condition change, and/or a configuration change in the computation infrastructure or in an arbitration operation utilized to resolve splits that may affect the operation of the computational infrastructure and/or the application workloads running on the nodes within a cluster.

For example, an event may include a failover of a workload. For example, application workloads may be executed at nodes of a cluster. Additionally, a redundant set of nodes may also be provided to execute the workload in the event of a failure or error at the executing node. During a failover, an execution of an application workload may be switched onto the redundant set of nodes such that the applications are available for use and downtimes may be reduced.

Additionally, as described above, one or more nodes within a cluster may be in communication with other nodes of the cluster. However, a communication link between two node groups may be interrupted. As a result, node groups which were previously connected and/or in communication with other node groups in the cluster may no longer be in communication with each other. The loss of communication may result in a partitioned network where instances of application workloads executing on two or more disparate node groups may lose their synchronization and separately attempt to read or write data or both from an associated data storage. Likewise, the loss of communication may result in a partitioned network where an executing application is running on one node, but another backup node is designated to execute the application in the event the presently executing node goes down since the backup node may erroneously assume, based on the communication break, that the presently executing node has gone down. Again, separate conflicting attempts to read or write data or both from an associated data storage may result. The result may be a computational split-brain condition where data and/or availability inconstancies originate from the maintenance of two separate data sets with overlap in scope. As such, unrecoverable errors may occur.

When a partitioned network occurs, one of the affected node groups may be retained as part of the cluster. The other affected node groups may, and should, be gracefully shut down and removed from the cluster. Prior to the graceful shutdown, the application workloads may be transferred to the node groups which have been retained.

Handling formation of a cluster, remodeling of a cluster, a partitioned network, and/or failovers in clusters during runtime may include making placement decisions regarding where (e.g., which node or nodes) to assign an application workload for execution in a cluster. In some examples, the nodes of the cluster may be statically configured and assigned to handle application workloads. As such, the nodes may be statically configured, and failover of workloads may be based on statically defined parameters and/or sequences.

However, utilizing the composable infrastructure model, a consumption-based modeling of the cluster may be utilized that involves scaling up the cluster, scaling down the cluster, and/or remodeling the cluster based on computational demand at the cluster. Since composable infrastructure may involve such fluid provisioning of the computational resources of the cluster, the aforementioned static configuration of the cluster may not provide a relatively most-suited node assignment for an application workload resulting in application slowdowns, downtime, and/or even failures. That is, the cluster may be managed blindly, unintelligently, and/or based on inappropriate or inaccurate assumptions about the nodes, the cluster, and/or the application workload to be executed. For example, if node one goes down in a cluster, the application workload may be failed over to node two, which may simply be the next in line per the static configuration. However, the real time conditions at and/or health of node two may be unknown and/or unconsidered at the time of its static configuration as the fail over node.

Additionally, during a partitioned network, network cluster splits may be resolved utilizing blind and/or unintelligent node selection. For example, when a split in the cluster occurs an arbitrator may be utilized to select which nodes of the two or more disparate node groups actively executing the application workloads and having lost their synchronicity are to survive and which are to be gracefully shutdown. In some examples, the arbitrator may include a quorum mechanism, which may include a quorum server acting as a third-party arbitrator deciding which of the nodes should survive.

The arbitrator may utilize a first-come-first-served mechanism to resolve the partition. That is, rather than involving a consideration of the capabilities and/or present health of the split node groups, the arbitrator may instead rely on a race system. That is, the first node or leader of a sub group of nodes that reaches the arbitrator may be awarded the right to be the surviving node group while the loser of the race is gracefully shut down.

Alternatively, the arbitrator may utilize a priority method to resolve the partition. For example, during the static configuration of the cluster one of the nodes or sub group of nodes may be assigned a predefined static priority and will thus be favored or awarded preference by the arbitrator in any split cluster resolution. That is, rather than involving a consideration of the capabilities and/or present health of the split node groups a winning cluster may be preordained.

In such examples, the nodes that are provisioned for execution of an application workload, awarded survivorship in a split, and/or selected as failover nodes may not be the relatively best node for that purpose. For example, nodes with high input/output latency may be the nodes that are provisioned, win the race, and/or are designated priority. The runtime conditions of the computational resources at the node are not considered in the aforementioned mechanisms. Therefore, nodes with relatively inferior parameters that might adversely impact the functioning of the workloads may be awarded workloads on account of an ignorance of their runtime conditions, future conditions, and/or suitability to execute a particular application workload being placed. Such examples may be inflexible and unable to meet performance and/or availability metrics that are defined as desired by users. Moreover, such examples may not scale out to meet an application workload's fluid resource demands.

In contrast, examples of the present disclosure may include a multi-faceted mechanism that informs node provisioning, failover node selection, partitioned network resolution, etc. leading to the selection of a relatively most suitable node to be selected in such operations. For example, a system consistent with the present disclosure may include instructions executable by a processing resource to receive, at a software-defined node of a computational infrastructure, a policy specifying a node metric criterion associated with executing a workload at the node; collect a present node metric corresponding to the specified node metric criterion at the node; receive a prediction, based on historical data, of a future modification to the present node metric corresponding to the specified node metric criterion at the node; determine, at the software-defined node, an eligibility value of the node to execute the workload based on the specified node metric criterion, the present node metric criterion, and the predicted future node metric criterion; and determine whether to deploy the workload to the node for execution based on the determined eligibility value.

FIG. 1 illustrates an example of a system 100 of node eligibility determinations consistent with the present disclosure. The system 100 may include a policy manager 102. A policy manager 102 may include an application such as a set of instructions operating on each node 104 in a cluster. The policy manager 102 may include a set of instructions to receive inputs from and/or send outputs to other applications and/or set of instructions through policy manager APIs. The policy manager 102 may include a controller and/or other computational resources to execute the instruction set at the node 104.

The policy manager 102 may receive a policy 108. For example, the policy manager may receive a policy 108 at a policy manager API. The policy 108 may include a policy 106 defined by a user at runtime. The policy 106 may specify node metric criterion for the specific node 104. Different nodes in the same cluster as the node 104 may receive distinct policies.

The policy 108 may specify node metric criterion that should exist at the node 104 in order for the node to satisfy the policy. The policy 108 may be based on a template. The policy 108 may be user defined. The policy 106 may be derived from a communication from an API of an application, such as the application whose workload is being placed, to an API of the policy manager 102. Therefore, the policy 108 may be specific to an application, an application workload to be placed, and/or to a node 104 where the policy 108 is being received.

The node metric criterion specified in the policy 108 may include threshold values for metrics of node health and/or node operation at the node 106. That is, the node metric criterion may specify a threshold level and/or amount of a node resource available at the node to execute an application workload. For example, a node metric criterion may specify a threshold CPU load, memory availability, latency, and/or any metric that may be tied to the successful execution of a corresponding application workload. For example, a first policy 108 received at the policy manager 102 of a first node 104 may specify that a node 104 with a CPU load of less than fifty percent and a memory load of less than twenty percent meets the threshold values to satisfy the policy 108 of a given application workload. A second policy received at a policy manager of a second node in the cluster may specify that a node with a CPU load of less than sixty percent, a memory load of less than twenty percent, and an input/output disk performance of less than or equal to two milliseconds of latency meets the threshold values to satisfy the second policy of a given application workload. In addition, where execution of an application workload includes a dependency on the execution of another application workload, then the policy 108 may also specify node metric criterion related to the execution of the other application workload. The node metric criterion included in the policy 108 may specify metrics of runtime conditions at the node 104 that may be suitable to execute an associated application workload at the node 104.

The policy manager 102 may parse the node metric criterion specified in the policy 108. The policy manager 102 may identify a metric to be collected from the node 104 in order to compare to the node metric criterion specified in the policy 108. The policy manager 102 may collect the current or runtime metrics from the node 104 that correspond to the node metric criterion specified in the policy 108. For example, the policy manager may collect and/or receive metrics of runtime conditions at the node 104 such as the CPU load, the available memory, the latency, etc. for the node 104.

The system 100 may include a prediction manager 110. The prediction manager 110 may include an application including instructions to produce a prediction, based on analysis of historical data of the node 104 and/or other nodes of the cluster, a future modification to the present runtime node metric, corresponding to the specified node metric criterion, from the node. That is, the prediction manager 110 may be executable to predict a future node metric value or a future change to a current node metric value.

The prediction manager 110 may predict a future node metric value or a future change to a current node metric value based on analysis of historical conditions at the node 104, in the cluster, at nodes executing the application workload, network conditions for the cluster, etc. The prediction manager 110 may utilize machine learning and/or artificial intelligence to develop these predictions. For example, the prediction manager 110 may utilize machine learning and/or or artificial intelligence to collect historical data, process historical data, develop algorithms and identify trends in historical data, utilize the machine developed algorithmics and/or machine identified trends to determine their predictions. In some examples, the prediction manager 110 may be made aware of the contents of the policy 108 and may utilize the policy 108 in determining its predictions. In some examples, the prediction manager 110 may develop its predictions without knowledge of the contents of the policy 108.

The prediction manager 110 may communicate its predictions to the policy manager 102. For example, the prediction manager 110 may communicate its predictions to the policy manager 102 through policy manager APIs. In some examples, the policy manager 102 may request the predictions be issued to it by the prediction manager 110. That is, the prediction manager 110 may issue a prediction to the policy manager 102 responsive to a request from the policy manager 102 for the same.

The policy manager 102 may collate each of the policies defined for its node 104. The policy manager 102 may utilize the node metric criterion from each of the collated received policies, the determined current node metrics, and/or the received predictions to determine an eligibility value for the node 104. An eligibility value may include a score that reflects the health of the node 104 and/or the suitability of the node to execute an application workload as determined based on current conditions at the node 104, future conditions at the node 104, and/or the node metric criterion specified in the policy 108 for the node 104. The policy manager 102 may calculate an eligibility value for the node 104 by comparing the node metrics collected at the node 104, which may be adjusted utilizing the predictions received from the prediction manager 110, to the node metric criterion specified in the policy 108. The eligibility value may be determined based on the node metrics collected at the node 104, which may be adjusted utilizing the predictions received from the prediction manager 110, relative to the node metric criterion specified in the policy 108.

For example, the node metrics collected at the node 104, which may be adjusted utilizing the predictions received from the prediction manager 110, that exceed the specified threshold for the criterion may receive a score that reflects that the thresholds have been exceeded and/or the magnitude by which the threshold have been exceeded.

The system 100 may also include a cluster manager 106. The cluster manager 106 may include an application including set of instructions. For example, the cluster manager 106 may include set of instructions operating on each node 104 in a cluster. In some examples the cluster manager 106 may be a component of and/or integrated with the policy manager 102. In some examples, the cluster manager 106 may stand alone from the policy manager 102 and/or communicate with the policy manager 102 through an API of the policy manager.

The cluster manager 106 may be utilized to decide and/or execute placement of application workloads on different nodes whenever there is a configuration change in a cluster of nodes. Additionally, in the case of a partitioned network the cluster manager 106 may be utilized to elect a coordinator node from a subgroup of nodes in a cluster and may be utilized to resolve the split in the cluster by coordinating with an arbitrator.

The cluster manager 106 may communicate with the policy manager 102 through a policy manager API. The cluster manager 106 may communicate with the cluster manager 106 on other nodes in the cluster. The cluster manager 106 may communicate with policy managers on other nodes in the cluster. In some examples, the cluster manager 106 may include a centralized component that collects data from, sends data to, and/or interfaces with the plurality of nodes in a cluster. In some examples, the cluster manager 106 may include a distributed application including components operating on each of the nodes 104 in a cluster that communicate with one another.

The eligibility value for a node 104 determined by the policy manager 102 of the node 104 may be communicated to the cluster manager 106. The cluster manager 106 may determine whether to deploy an application workload to a node and/or which node of the cluster will receive an application workload or survive a split based on the eligibility value determined from that node 104. For example, a node 104 of a plurality of nodes in a cluster may be assigned to execute an application workload when its eligibility value is the highest among the plurality of nodes in the cluster for the policy 108 corresponding to the application workload. That is, the cluster manager 106 may be able to determine which of a plurality of nodes in a cluster is best suited for executing an application workload by comparing their respective eligibility values. In further examples, the cluster manager 106 may be able to determine which of a plurality of nodes in a cluster meets the node metric criterion for executing an application workload by comparing their respective eligibility values.

Figure 2:
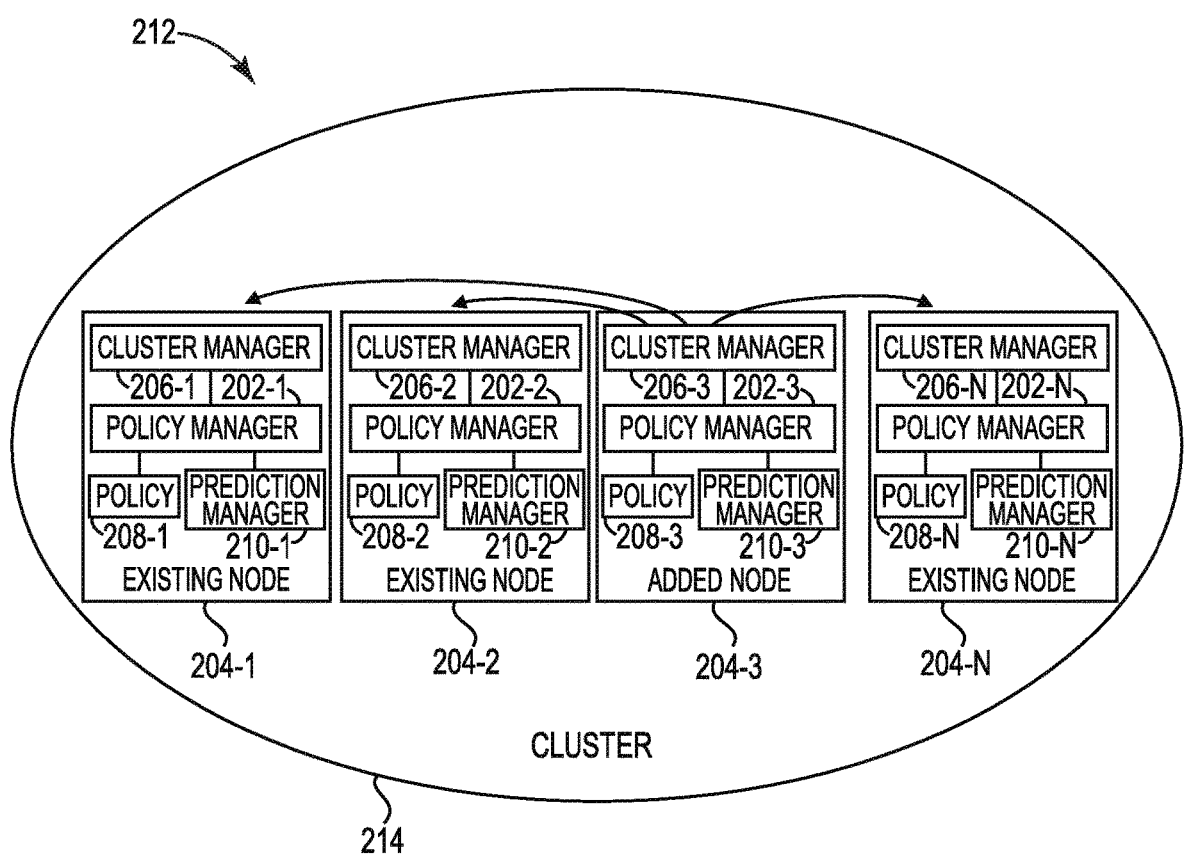
FIG. 2 illustrates an example of node eligibility determinations consistent with the disclosure.

FIG. 2 illustrates an example of a system 212 of node eligibility determinations consistent with the present disclosure. The system 212 may include a composable infrastructure cluster 214 of computational resources. For example, the cluster 214 may be made up of a plurality of software-defined computational nodes 204-1 . . . 204-N.

Each of the nodes 204-1 . . . 204-N may be provisioned to execute an application workload in the cluster 214. Each of the nodes 204-1 . . . 204-N may have an instance of a cluster manager 206-1 . . . 206-N running on them. Each of the cluster managers 206-1 . . . 206-N may communicate with the other cluster managers 206-1 . . . 206-N in the cluster 214.

Each of the nodes 204-1 . . . 204-N may also include a policy manager 202-1 . . . 202-N, a policy 208-1 . . . 208-N, and a prediction manager 210-1 . . . 210-N. The policy manager 201-1 . . . 202-N may receive a user defined policy 208-1 . . . 208-N specifying a node metric criterion corresponding to a node metric defined by the user as being involved in the successful execution of a corresponding application workload. The policy manager 202-1 . . . 202-N for a particular node 204-1 . . . 204-N may determine from the policy 208-1 . . . 208-N for the node 204-1 . . . 204-N which node metrics from the node 204-1 . . . 204-N should be collected. The policy manager 202-1 . . . 202-N may collect the current run time metrics for each of the node metrics at the node 204-1 . . . 204-N. Additionally, the policy manager 202-1 . . . 202-N for a particular node 204-1 . . . 204-N may request and/or receive a prediction of a future node metric and/or a prediction of a future modification to a node metric from the prediction manager 210-1 . . . 210-N for the node 204-1 . . . 204-N. The prediction manager 210-1 . . . 210-N for a particular node 204-1 . . . 204-N may analyze and apply machine learning and/or artificial intelligence to historical data regarding node metrics to determine its predictions.

The policy manager 202-1 . . . 202-N for a particular node 204-1 . . . 204-N may determine an eligibility value for the particular node 204-1 . . . 204-N as it relates to a particular application workload execution based on the policy 204-1 . . . 204-N for that particular application workload execution, the current node metrics at the node 204-1 . . . 204-N, and/or the prediction from the prediction manager 210-1 . . . 210-N. The eligibility value determined for the node may be communicated to the cluster manager 206-1 . . . 206-N of the node 204-1 . . . 204-N and/or the cluster manager 206-1 . . . 206-N of another node 204-1 . . . 204-N. Eligibility values of different nodes 204-1 . . . 204-N may be compared to one another to determine which of the nodes 204-1 . . . 204-N in a cluster satisfies the node metric criterion for a particular application workload and/or which of the nodes 204-1 . . . 204-N is relatively most suited to execute the application workload based on the node metric criterion.

The cluster manager 206-1 . . . 206-N may detect a change in a configuration of the cluster 214. For example, a cluster manager 206-1 . . . 206-N may detect the addition of a node, such as added node 204-3, to a cluster 214 of existing nodes 204-1, 204-2, 204-N. In an example, a cluster manager 206-1, 206-2, 206-N may detect that a new node 204-3 has been added and is attempting to establish communication with the existing nodes 204-1, 204-2, 204-N of the cluster 214. Upon detecting an added node 204-3, the cluster manager 206-3 of the added node 204-3 may be prompted to calculate and report an eligibility value for the added node 204-3 to the existing nodes 204-1, 204-2, 204-N of the cluster 214.

Responsive to detecting the addition of the added node 204-3, the cluster manager 206-3 of the added node 204-3 may obtain the eligibility value from the policy manager 202-3 of the added node 204-3. As described above, the eligibility value for the added node 204-3 may be determined based on the policy 208-3 at the added node 204-3, the current node metrics at the added node 204-3, and/or a prediction of future node metrics at the added node 204-3 by the prediction manager 210-3.

The cluster manager 206-3 at the added node 204-3 may communicate the eligibility value for the added node 204-3 to the existing nodes 204-1, 204-2, 204-N in the cluster. In this manner, the eligibility value of each node 204-1 . . . 204-N of a cluster 214 may be distributed to and/or known by the other nodes 204-1 . . . 204-N in the cluster 214. The cluster manager 206-1 . . . 206-N may now evaluate the relative suitability of each of the active nodes 204-1 . . . 204-N in the cluster 214 to execute an application workload prior to placing the workload on them, by comparison of the eligibility value reported for each of the nodes 204-1 . . . 204-N. Cluster managers 206-1 . . . 206-N may communicate to select which of the active nodes 204-1 . . . 204-N to place the application workload on in the cluster 214 based on the eligibility value of each of the active nodes 204-1 . . . 204-N in the cluster 214.

Figure 3:
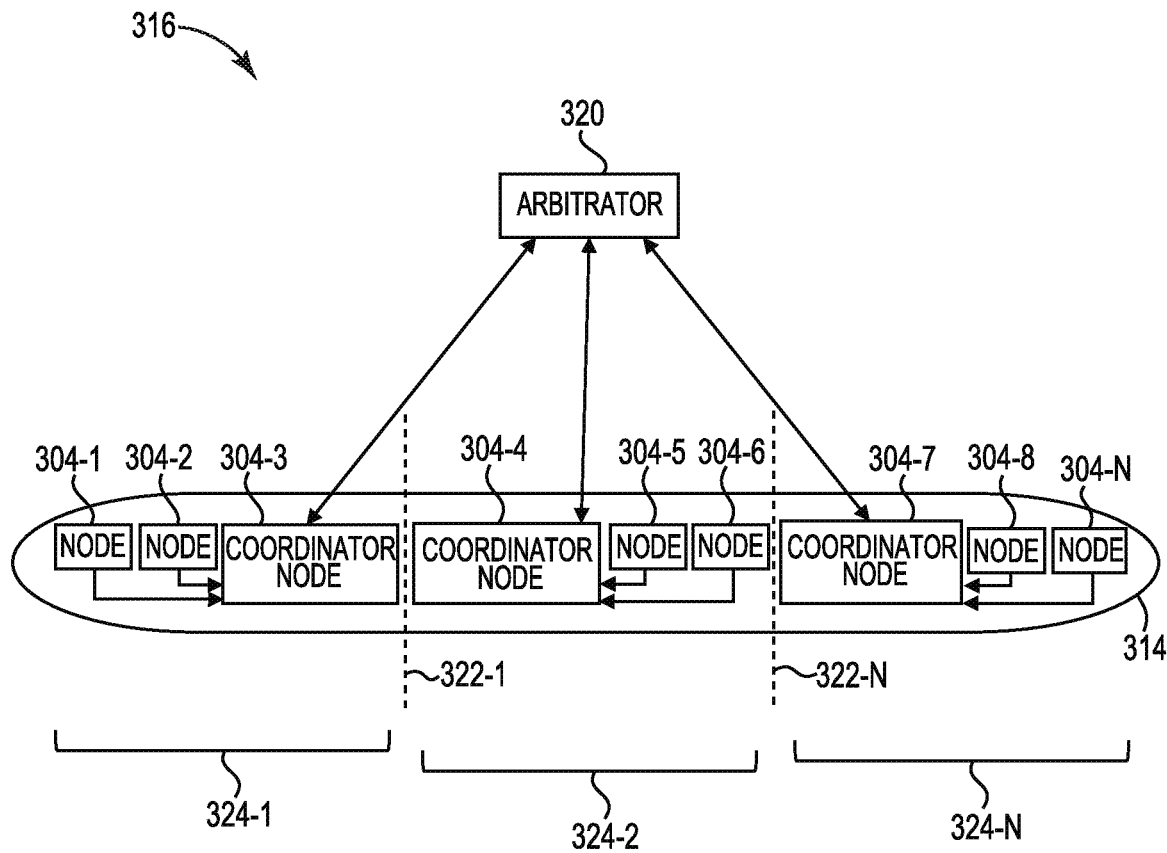
FIG. 3 illustrates an example of node eligibility determinations consistent with the disclosure.

FIG. 3 illustrates an example of a system 316 of node eligibility determinations consistent with the present disclosure. The system 316 may include a composable infrastructure cluster 314 of computational resources. For example, the cluster 314 may be made up of a plurality of software-defined computational nodes 304-1 . . . 304-N.

The nodes 304-1 . . . 304-N of the cluster 314 may be organized into subgroups 324-1 . . . 324-N. That is, the cluster 314 may be made up of a plurality of node subgroups 324-1 . . . 324-N, where each node subgroup 324-1 . . . 324-N includes a plurality of nodes 304-1 . . . 304-N. For example, the cluster 314 may include a first node subgroup 324-1 made up of first plurality of nodes 304-1, 304-2, 304-3. The cluster 314 may include a second node subgroup 324-2 made up of a second plurality of nodes 304-4, 304-5, 304-6. The cluster 314 may include a third node subgroup 324-N made up of a third plurality of nodes 304-7, 304-8, 304-N.

Each of the node subgroups 324-1 . . . 324-N may include a coordinator node 304-3, 304-4, 304-7. For example, the first node subgroup 324-1 may include a first coordinator node 304-3. The second node subgroup 324-2 may include a second coordinator node 304-4. The third node subgroup 324-N may include a third coordinator node 304-7. The coordinator node 304-3, 304-4, 304-7 may collect data from, communicate with, and/or manager each of the non-coordinator nodes in its node subgroup 324-1 . . . 324-N. The coordinator node 304-3, 304-4, 304-7 may also communicate with an arbitrator 320 on behalf of its node subgroup 324-1 . . . 324-N.

The system 316 may include an arbitrator 320. The arbitrator 320 may, responsive to detecting a partitioned network, be utilized to select which node subgroup 324-1 . . . 324-N of the cluster 314 actively executing an application workload is to survive and which node subgroup 324-1 . . . 324-N is to be gracefully shutdown. In some examples, the arbitrator 320 may include a quorum mechanism, which may include a quorum server acting as a third-party arbitrator deciding which of the node subgroup 324-1 . . . 324-N should survive in a partitioned network.

Each of the individual nodes 304-1 . . . 304-N of the cluster may include a cluster manager. A cluster manager on a node 304-1 . . . 304-N in a particular node subgroup 324-1 . . . 324-N may be in communication with the cluster managers of the other nodes 304-1 . . . 304-N in the same node subgroup 324-1 . . . 324-N. The cluster manager on the coordinator node 304-3, 304-4, 304-7 of a particular node subgroup 324-4 . . . 324-N may be in communication with an arbitrator 320 on behalf of that node subgroup.

Each of the nodes 304-1 . . . 304-N may also include a policy manager, a policy, and a prediction manager. The policy manager may receive user defined policies specifying a node metric criterion corresponding to a node metric defined by the user as being involved in the successful execution of a corresponding application workload. The policy manager for a particular node 304-1 . . . 304-N may determine from the policy for the node 304-1 . . . 304-N which node metrics from the node 304-1 . . . 304-N should be collected. The policy manager may collect the current run time metrics for each of those determined node metrics at the node 304-1 . . . 304-N. Additionally, the policy manager for a particular node 304-1 . . . 304-N may request and/or receive a prediction of a future node metric and/or a prediction of a future modification to a node metric from the prediction manager for the particular node. The prediction manager for a particular node 304-1 . . . 304-N may analyze and apply machine learning and/or artificial intelligence to historical data regarding node metrics to determine its predictions.

The policy manager for each particular node 304-1 . . . 304-N may determine an eligibility value for the particular node 304-1 . . . 304-N as it relates to a particular application workload execution. The policy manager may determine the eligibility value based on the policy for that particular application workload execution, the current node metrics at the node 304-1 . . . 304-N, and/or the prediction from the prediction manager. The eligibility value determined for the node 304-1 . . . 304-N may be communicated to the cluster manager of the node 304-1 . . . 304-N and/or the cluster manager of another node 304-1 . . . 304-N. For example, the eligibility value for a first node 304-1 of a first node subgroup 324-1 may be communicated to the cluster manager of the coordinator node 304-3 of the first node subgroup 304-3.

As previously described, a cluster manager may detect a network partition 322-1 . . . 322-N in the cluster 314. That is, the cluster manager may be able to detect that node subgroups 324-1 . . . 324-N have lost synchronization due to a partition 322-1 . . . 322-N to the computational infrastructure network disrupting their communication. As such, the cluster manager may detect that the node subgroups 324-1 . . . 324-N have become partitioned node subgroups 324-1 . . . 324-N as a result of the cluster split and may be in danger of computational split-brain.

In response to detecting the network partition 322-1 . . . 322-N, the cluster manager may elect a new coordinator node for a partitioned node subgroup 324-1 . . . 324-N. The cluster manager of the coordinator node 304-3, 304-4, 304-7 may request an eligibility value be submitted for each of the non-coordinator nodes in its node subgroup. The cluster manager of the coordinator node 304-3, 304-4, 304-7 may submit such a request to the cluster manager and/or the policy manager of each of the non-coordinator nodes in its node subgroup.

The policy engine of each of the non-coordinator nodes may determine an eligibility value for the node. The policy engine of each of the non-coordinator nodes may send the eligibility value for its non-coordinator node to the cluster manager and/or policy engine on the coordinator node 304-3, 304-4, 304-7 for its respective node subgroup 324-1 . . . 324-N. Additionally, the policy engine of the coordinator node 304-3, 304-4, 304-7 may determine an eligibility value for the coordinator node 304-3, 304-4, 304-7.

For example, a cluster manager may detect a network partition 322-1 . . . 322-N and may assign a new first coordinator node 304-3 to a first node subgroup 324-1. The policy engine of the first coordinator node 304-3 may determine an eligibility value for the first coordinator node 304-3. The first coordinator node 304-3 may request the eligibility value from each of the remaining non-coordinating nodes 304-1 and 304-2 of the first node subgroup 324-1. Responsive to the request, the policy engine of first non-coordinator node 304-1 may determine an eligibility value for the first non-coordinator node 304-1 and report it to the policy engine of the coordinator node 304-3. Additionally, responsive to the request, the policy engine of second non-coordinator node 304-2 may determine an eligibility value for the second non-coordinator node 304-2 and report it to the policy engine of the coordinator node 304-3.

Once the policy engine of a coordinator node 304-3, 304-4, 304-7 has the eligibility value for itself and for the remaining non-coordinator nodes of the node subgroup 324-1 . . . 324-N, the policy engine may determine an overall eligibility value for the entire node subgroup 324-1 . . . 324-N that the coordinator node 304-3, 304-4, 304-7 is coordinating. For example, the policy engine of the first coordinator node 304-3 may determine an overall eligibility value for the first node subgroup 324-1 based on the eligibility value of the first coordinator node 304-3, the eligibility value for the first non-coordinator node 304-1, and the eligibility value for the second non-coordinator node 304-2. For example, the policy engine of the first coordinator node 304-3 may determine an overall eligibility value for the first node subgroup 324-1 by summing the eligibility value of the first coordinator node 304-3, the eligibility value for the first non-coordinator node 304-1, and the eligibility value for the second non-coordinator node 304-2.

The policy engine of the first coordinator node 304-3 may communicate the overall eligibility value for the first node sub group 324-1 to the cluster manager of the first coordinator node 304-3. The process may be repeated for each of the node subgroups 324-1 . . . 324-N until the respective coordinator nodes 304-3, 304-4, and 304-7 of each subgroup have determined an overall eligibility value for the subgroup they coordinate. For example, similar processes may be repeated for the second node subgroup 324-2 and the third node subgroup 324-N such that the cluster manager for the second coordinator node 304-4 determines an overall eligibility value for the second node subgroup 324-2 and the cluster manager for the third coordinator node 304-7 determines an overall eligibility value for the third node subgroup 324-N.

The cluster manager on each of the coordinator nodes 304-3, 304-4, and 304-7 may submit their eligibility value for their node subgroup to the arbitrator 320. For example, the cluster manager on each of the coordinator nodes 304-3, 304-4, and 304-7 may participate in a quorum race to the arbitrator 320 on behalf of the node subgroup 324-1 . . . 324-N that they represent, carrying along with themselves a recommendation in the form of the overall eligibility value for the node subgroup 324-1 . . . 324-N that they represent.

The arbitrator 320 may determine which of the node subgroups 324-1 . . . 324-N will be allowed to execute an application workload, and which will be gracefully shutdown. The arbitrator 320 may determine which node subgroup 324-1 . . . 324-N will survive based on the overall eligibility value reported for the node subgroup 324-1 . . . 324-N by the cluster manager of its representative coordinator node 304-3, 304-4, 304-7. The arbitrator 320 may select a node subgroup 324-1 . . . 324-N for survival with a relatively highest eligibility value and/or may narrow the pool of node subgroups 324-1 . . . 324-N from which a survivor may be selected to those which exceed threshold node metric criterion as evidenced by the overall eligibility value.

Figure 4:
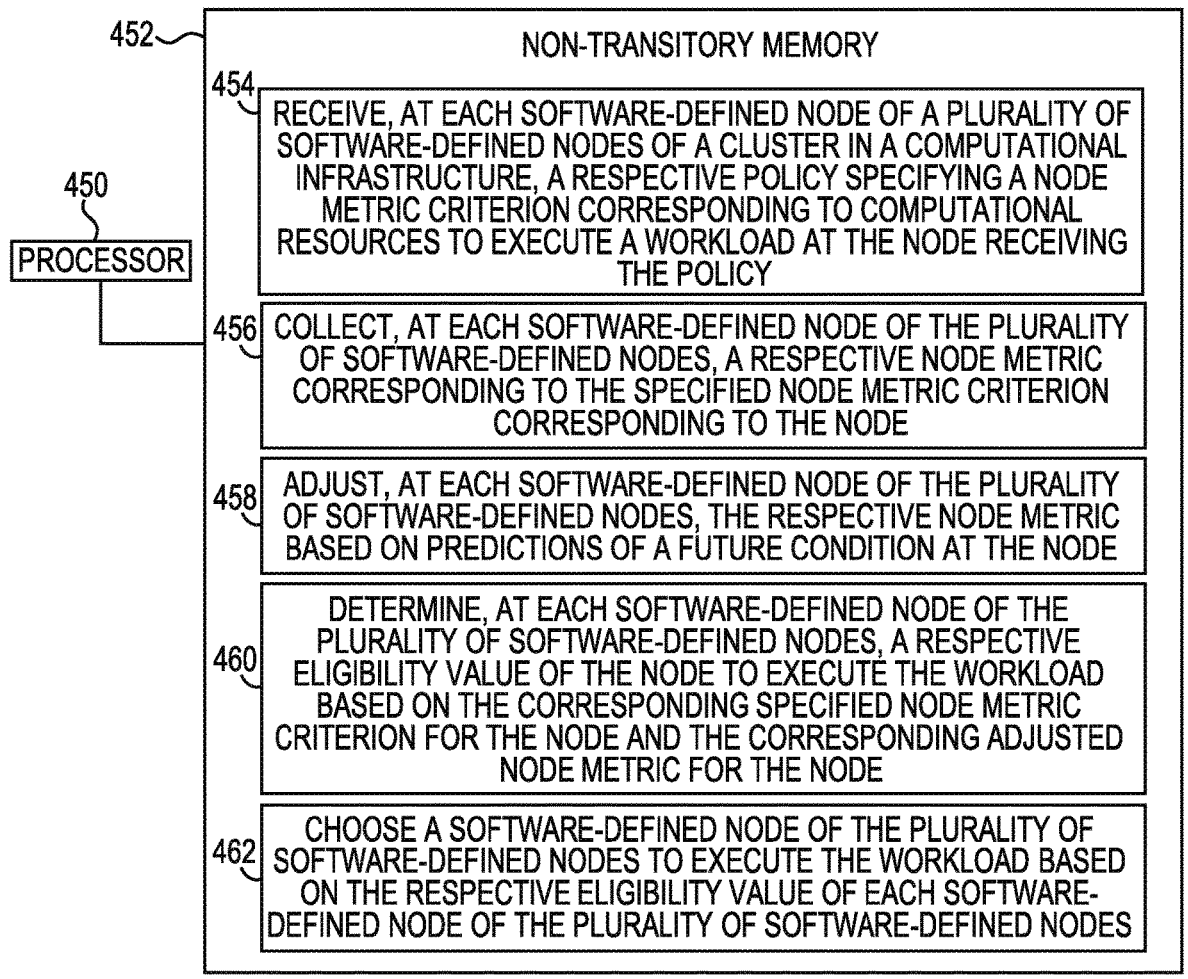
FIG. 4 illustrates an example of a non-transitory machine-readable memory resource and processing resource for node eligibility determinations consistent with the disclosure.

FIG. 4 illustrates an example of a non-transitory machine-readable memory resource and processing resource for node eligibility determinations consistent with the present disclosure. The processing resource 450, and the non-transitory memory resource 452, illustrated in FIG. 4 may be analogous to the elements illustrated in FIGS. 1, 2, and 3. A memory resource, such as the non-transitory memory resource 452, may be used to store instructions (e.g., 454, 456, 458, 460, 462, etc.) executed by the processing resource 450 to perform the operations as described herein. The operations are not limited to a particular example described herein and may include additional operations such as those described with regard to the system 100, system 200, system 300, and the method 580 described in connection with FIGS. 1, 2, 3, and 5.

The non-transitory memory resource 452 may store instructions 454 executable by the processing resource 450 to receive, at each software-defined node of a plurality of software-defined nodes of a cluster in a computational infrastructure, a respective policy. The policy may specify a node metric criterion corresponding to executing an application workload at the node receiving the policy. The policy may be specified by a user. For example, a user purchasing access to computational infrastructure to support their application may define the policy.

The node metric criterion may include threshold values of node metrics at a given node. The threshold values may be values that a user has specified as being a value of a computational resource available at the node that will allow their application workload to be seamlessly executed without delays and/or outages.

Different nodes in the same cluster may receive different policies. For example, a first node of the plurality of nodes may receive a first policy specifying a first node metric criterion while a second node of the plurality of nodes may receive a second policy specifying a second node metric criterion that is different from the first node metric criterion. For example, a first node may receive a policy including a node metric criterion amount of a CPU load of less than seventy percent and a memory availability of greater than fifty percent. The second node, however, may receive a policy including a node metric criterion amount of CPU load of less than sixty percent, a memory availability of greater than fifty percent, and a latency of less than or equal to two milliseconds.

The non-transitory memory resource 452 may store instructions 456 executable by the processing resource 450 to collect, at each software-defined node of the plurality of software defined nodes, a respective node metric. The node metrics to be collected may be the node metrics corresponding to the specified node metric criterion corresponding to the node. That is, the node metrics to be collected at a node may be the node metrics specified by the policy received at that node.

For example, the policy of a particular node may be parsed to determine the node metrics implicated by the node metric criterion in the policy. The node metrics implicated by the node metric criterion in the policy may be the node metrics collected at the node. The node metrics may be collected at run time and/or may be representative of the current conditions at the node. The node metrics may be metrics of conditions at the node that are related to computational health of the node. In some examples, the node metrics may be metrics of conditions at the node that are related to computational health at is specifically relates to unique demands placed on nodes by execution of a particular application workload to be placed.

The non-transitory memory resource 452 may store instructions 458 executable by the processing resource 450 to adjust, at each software-defined node of the plurality of software-defined nodes, the respective node metric. Adjusting the respective node metric may include utilizing predictions of a future condition at the node to adjust and/or weight a current metric. For example, while a current node metric at a node may show that CPU load at the node is at sixty percent, analysis of historical data at the node may result in a prediction that within the next three hours the CPU load may rise an additional twenty-five percent. Therefore, based on the prediction, the current metric may have its weight reduced and/or be adjusted to eighty-five percent when being considered to execute an application workload over the next three hours.

The prediction of future conditions that may be utilized to adjust the current metric may be developed based on analysis of historical conditions at the node by a machine learning utility. However, the development of the prediction may not be limited to historical data at a same node where the current node metric is collected. For example, in order to account for dependencies between nodes and/or application workload executions, the prediction of a future condition at the node may be developed based on analysis of historical conditions at another node, that the shares a relationship with, by a machine learning utility.

The non-transitory memory resource 452 may store instructions 460 executable by the processing resource 450 to determine, at each software-defined node of the plurality of software defined nodes, a respective eligibility value of the node. The eligibility value you may be a score that is reflective of the ability of the node to execute the application workload being placed. The eligibility value may be based on the corresponding specified node metric criterion of the policy at the node and the corresponding adjusted node metric for the node. That is, the eligibility value may be determined based on a comparison of the current conditions at the node, a prediction of future conditions at the node, and a specification of the threshold conditions to satisfy the policy for execution of the application workload. In some examples, the respective eligibility value of each software-defined node of the plurality of software defined nodes may be a value corresponding to the comprehensive computational health of the corresponding nodes as it specifically relates to execution of the application workload being placed.

In some examples, the respective eligibility value of each software-defined node of the plurality of software-defined nodes may be requested by a coordinator node. That is, a coordinator node for a portion of the plurality of nodes may request from non-coordinator nodes in the same portion to determine and/or report their respective eligibility values. The respective eligibility values of each of the non-coordinator nodes may be received at the coordinator node. The coordinator node may compile the eligibility values for its portion. In some examples, the coordinator node may communicate the eligibility values for its portion to an arbitrator for comparison against the eligibility values for nodes of other portions.

The non-transitory memory resource 452 may store instructions 462 executable by the processing resource 450 to choose a software-defined node of the plurality of software-defined nodes to execute the workload. The choice may be based on the respective eligibility value of each software-defined node of the plurality of software defined nodes. For example, since the eligibility value is indicative of the computational health of the node as it relates to executing a specific application workload, the eligibility values of each of the software-defined nodes may be compared to one another in order to identify the particular software-defined node with a relatively best eligibility value reflective of a relative suitability to execute the application workload at the other nodes.

Additionally, a split may be detected in the cluster such that a first portion of the cluster loses communication and/or synchronization with a second portion of the cluster. For example, the first portion of the cluster may be a first node and a second portion of the cluster may be a second node. The first node and the second node may be duplicative instances of an application workload execution. Alternatively, the first node and the second node may be paired such that the first node is an application workload executing node and the second node is a backup node in case the first node goes down. Regardless, upon detecting a split in the communication between the two nodes one of the nodes may be selected to continue or take up execution of the application workload while the other node may be instructed to gracefully shut down. For example, when such a split is detected, choosing the software-defined node of the plurality of software-defined nodes to execute the workload may include choosing the first node to survive to execute the workload and choosing the duplicative node and/or backup second node to shut down.

Figure 5:
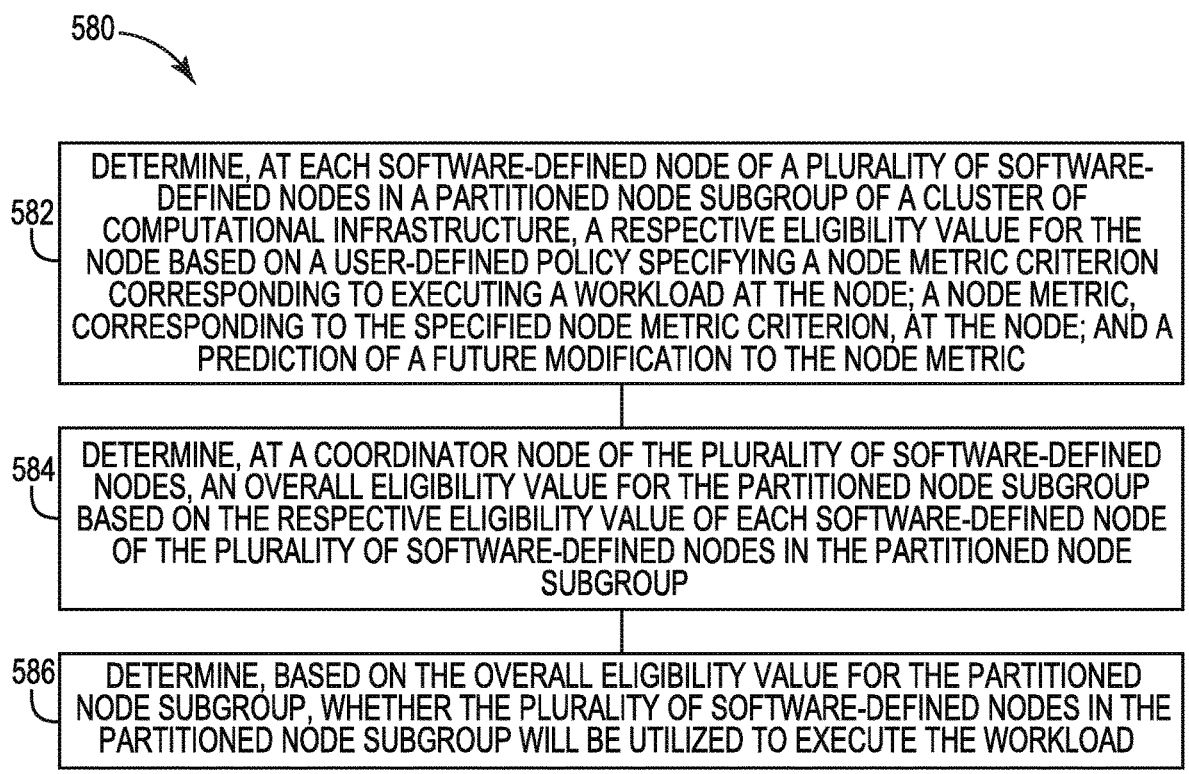
FIG. 5 illustrates a diagram of an example of a method for node eligibility determinations consistent with the disclosure.

FIG. 5 illustrates an example of a method 580 for node eligibility determinations consistent with the present disclosure. At 582, the method 580 may include determining, at each software-defined node of a plurality of software defined nodes in a partitioned node subgroup of a cluster of computational infrastructure, a respective eligibility value for the node. The eligibility value of each node may be determined based on a user-defined policy specifying a node metric criterion corresponding to executing an application workload at the node. As such, a framework and/or user interface may be provided that facilitates a user being able to fluidly and flexibly input and/or modify their desired policies.

Additionally, the eligibility value may be based on a current node metric, corresponding to the specified node metric criterion, captured at the node at run time. The eligibility value may be based on a prediction of a future modification to the node metric.

At 584, the method 580 may include determining, at a coordinator node of the plurality of software defined nodes, an overall eligibility value for the partitioned node subgroup. The overall eligibility value may be determined based on the respective eligibility value of each software-defined node of the plurality of software defined nodes in the partitioned node subgroup.

The overall eligibility value may be determined at a policy manager of the coordinator node. The overall eligibility value may be communicated to a cluster manager and/or to an arbitrator. The arbitrator may utilize the overall eligibility value to determine whether the partitioned node subgroup will survive.

At 586, the method 580 may include determining, based on the overall eligibility value for the partitioned node subgroup, whether the plurality of software-defined nodes in the partitioned node subgroup will survive and be utilized to execute the workload or whether they will be shut down.

For example, the eligibility value for the partitioned node subgroup may be communicated to the arbitrator. Additionally, other overall eligibility values from other partitioned node subgroups of the cluster may be communicated to the arbitrator.

The arbitrator may compare the overall eligibility values from a plurality of partitioned nodes subgroups. Based on the comparison, it may be determined that the overall eligibility value for the partitioned node subgroup exceeds the overall eligibility values from the other partitioned node subgroups. Based on this determination, the partitioned node subgroup may be designated to be utilized to execute the application workload. For example, the arbitrator may designate the partitioned node subgroup to execute the application workload. As such, the application workload may be distributed to the partitioned node subgroup for execution. The other partitioned node subgroups that may be running duplicative application workloads may be shut down.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system comprising:
   a processing resource;
   a non-transitory machine-readable medium storing machine-readable instructions to cause the processing resource to:
   collect present node metrics for respective software-defined nodes in a cluster in a computational infrastructure;
   predict node metrics for the respective software-defined nodes based on predicted future conditions of the respective software-defined nodes;
   compute eligibility values of the respective software-defined nodes based on the present node metrics and the predicted node metrics;
   detect a split between a first subgroup of the respective software-defined nodes in the cluster and a second subgroup of the respective software-defined nodes in the cluster due to a loss of communication between the first subgroup and the second subgroup that results in a loss of synchronization between a first instance of a given workload executed in the first subgroup and a second instance of the given workload executed in the second subgroup; and
   choose, based on eligibility values of corresponding software-defined nodes in the first subgroup and the second subgroup as determined in the computing, one of the first subgroup and the second subgroup to execute the given workload after the split.

2. The system of claim 1, wherein the machine-readable instructions are to cause the processing resource to identify the present node metrics to collect based on node metric criteria of respective policies received by the respective software-defined nodes.

3. The system of claim 2, wherein the machine-readable instructions are to cause the processing resource to compute an eligibility value of a first software-defined node and communicate the eligibility value of the first software-defined node to other software-defined nodes of the cluster, responsive to detecting an addition of the first software-defined node to the cluster.

4. The system of claim 1, wherein the choosing of one of the first subgroup and the second subgroup is based on comparing a first overall eligibility value of the first subgroup to a second overall eligibility value of the second subgroup.

5. The system of claim 4, wherein the first overall eligibility value of the first subgroup is based on aggregating eligibility values of corresponding software-defined nodes in the first subgroup, and the second overall eligibility value of the second subgroup is based on aggregating eligibility values of corresponding software-defined nodes in the second subgroup.

6. The system of claim 5, wherein the first overall eligibility value of the first subgroup is based on summing the eligibility values of the corresponding software-defined nodes in the first subgroup, and the second overall eligibility value of the second subgroup is based on summing the eligibility values of the corresponding software-defined nodes in the second subgroup.

7. The system of claim 5, wherein the machine-readable instructions are to cause the processing resource to:
compute the first overall eligibility value at a first coordinator node in the first subgroup;
compute the second overall eligibility value at a second coordinator node in the second subgroup; and
submit, from the first coordinator node and the second coordinator node to an arbitrator, the first overall eligibility value and the second overall eligibility value, wherein the choosing is by the arbitrator.

8. A non-transitory machine-readable medium comprising machine-readable instructions to cause a system to:
at each respective software-defined node of a plurality of software-defined nodes of a cluster in a computational infrastructure:
receive a respective policy specifying a node metric criterion corresponding to computational resources to execute a workload at the respective software-defined node;
collect a respective node metric corresponding to the node metric criterion of the respective policy;
adjust the respective node metric based on a prediction of a future condition at the respective software-defined node;
compute a respective eligibility value of the respective software-defined node to execute the workload based on the node metric criterion of the respective policy and the adjusted respective node metric;
detect a split between a first portion of the plurality of software-defined nodes and a second portion of the plurality of software-defined nodes due to a loss of communication between the first portion and the second portion that results in a loss of synchronization between a first instance of a given workload executed in the first portion and a second instance of the given workload executed in the second portion; and
choose, based on eligibility values of corresponding software-defined nodes in the first portion and the second portion as determined in the computing, a first software-defined node of one of the first portion and the second portion to execute the given workload after the split.

9. The non-transitory machine-readable medium of claim 8, wherein the machine-readable instructions upon execution cause the system to choose a second software-defined node of another one of the first portion and the second portion to remove from the cluster.

10. The non-transitory machine-readable medium of claim 9, wherein the removing of the second software-defined node from the cluster comprises instructing the second software-defined node to shut down.

11. The non-transitory machine-readable medium of claim 8, wherein the machine-readable instructions upon execution cause the system to determine the prediction of the future condition at the respective software-defined node based on an analysis, using machine learning, of historical conditions at the respective software-defined node.

12. The non-transitory machine-readable medium of claim 8, wherein the machine-readable instructions upon execution cause the system to determine the prediction of the future condition at the respective software-defined node based on an analysis, using machine learning, of historical conditions at another software-defined node that the respective software-defined node shares a relationship with.

13. The non-transitory machine-readable medium of claim 8, wherein the machine-readable instructions upon execution cause the system to:
request, by a first coordinator node, the respective eligibility value of each software-defined node of the first portion of the plurality of software-defined nodes;
receive the respective eligibility value of each software-defined node of the first portion of the plurality of software-defined nodes at the first coordinator node;
request, by a second coordinator node, the respective eligibility value of each software-defined node of the second portion of the plurality of software-defined nodes; and
receive the respective eligibility value of each software-defined node of the second portion of the plurality of software-defined nodes at the second coordinator node.

14. The non-transitory machine-readable medium of claim 8, wherein the machine-readable instructions upon execution cause the system to:
receive, at the first software-defined node, a first policy specifying a first node metric criterion; and
receive, at a second software-defined node of the plurality of software-defined nodes, a second policy specifying a second node metric criterion that is different from the first node metric criterion.

15. The non-transitory machine-readable medium of claim 8, wherein the choosing of the first software-defined node is based on comparing a first overall eligibility value of the first portion to a second overall eligibility value of the second portion, wherein the first overall eligibility value of the first portion is based on aggregating eligibility values of corresponding software-defined nodes in the first portion, and the second overall eligibility value of the second portion is based on aggregating eligibility values of corresponding software-defined nodes in the second portion.

16. A method, comprising:
- determining, at each respective software-defined node of a plurality of software-defined nodes in a partitioned node subgroup of a cluster of software-defined nodes, a respective eligibility value for the respective software-defined node based on:
  - a policy specifying a node metric criterion corresponding to executing a workload at the respective software-defined node,
  - a node metric, corresponding to the node metric criterion, at the respective software-defined node, and
  - a prediction of a future modification to the node metric;
- determining, at a coordinator node of the plurality of software-defined nodes, an overall eligibility value for the partitioned node subgroup based on the respective eligibility values of the plurality of software-defined nodes in the partitioned node subgroup;
- communicating the overall eligibility value for the partitioned node subgroup from the coordinator node to an arbitrator; and
- determining whether the plurality of software-defined nodes in the partitioned node subgroup will be utilized to execute the workload, based on comparing, by the arbitrator, the overall eligibility value for the partitioned node subgroup to overall eligibility values for other partitioned node subgroups received at the arbitrator, and wherein an overall eligibility value for a given partitioned node subgroup of the other partitioned node subgroups is based on eligibility values of software-defined nodes in the given partitioned node subgroup.

17. The method of claim 16, wherein determining whether the plurality of software-defined nodes in the partitioned node subgroup will be utilized to execute the workload includes:
- determining, based on the comparison, the overall eligibility value for the partitioned node subgroup exceeds each of the overall eligibility values for the other partitioned node subgroups; and
- designating the partitioned node subgroup to be utilized to execute the workload based on the determination that the overall eligibility value for the partitioned node subgroup exceeds each of the overall eligibility values for the other partitioned node subgroups.

18. The method of claim 17, comprising distributing the workload to the partitioned node subgroup for execution responsive to the designation from the arbitrator.

\* \* \* \* \*